United States Patent Office 3,430,526
Patented Mar. 4, 1969

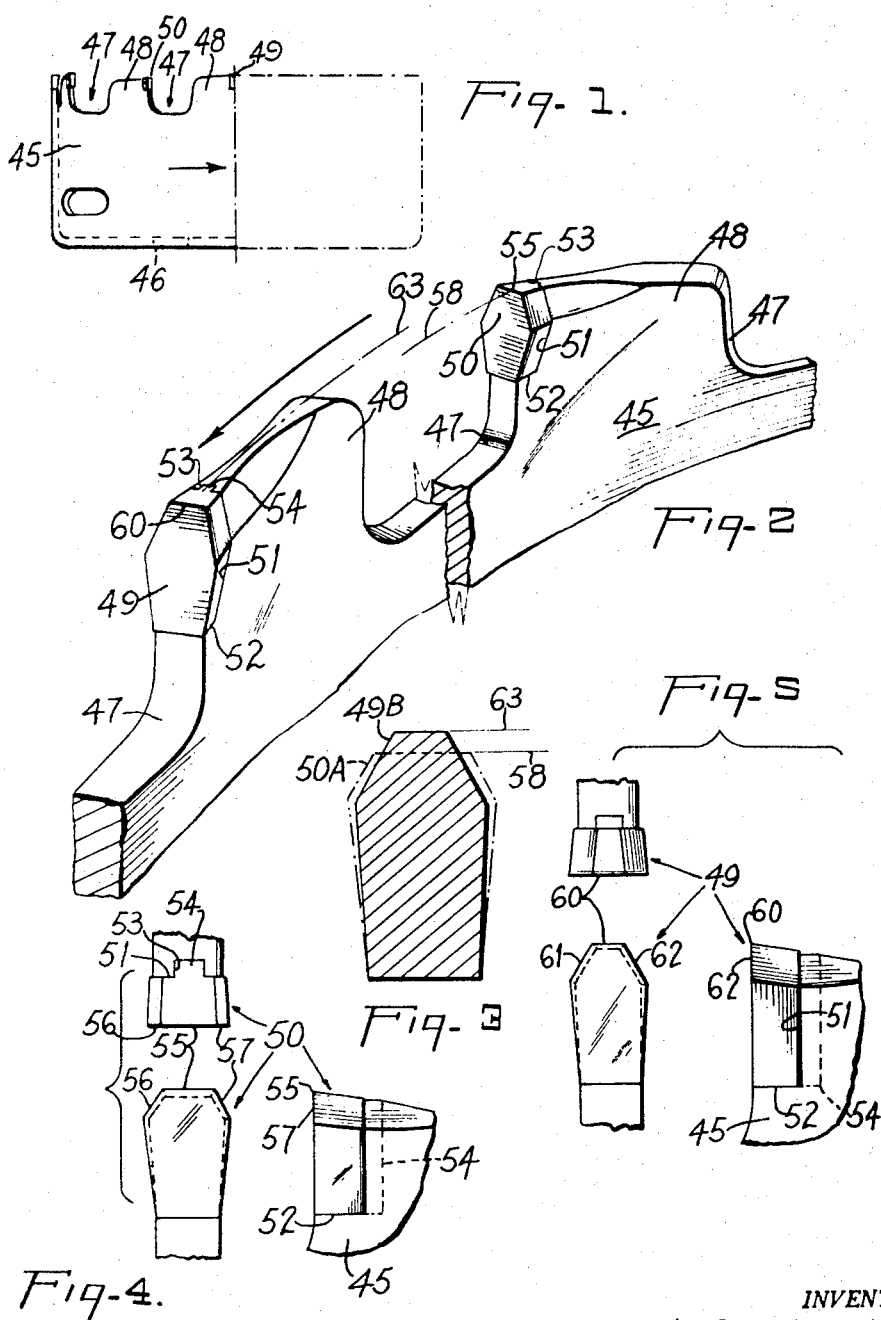

3,430,526
SHELL CUTTER
Frank P. Valenziano, Summit, N.J., assignor to Interpace Corporation, a corporation of Delaware
Original application June 30, 1965, Ser. No. 468,302, now Patent No. 3,364,939, dated Jan. 23, 1968. Divided and this application Sept. 19, 1967, Ser. No. 668,878
U.S. Cl. 77—69       3 Claims
Int. Cl. B23b 51/04; B28d 1/00

ABSTRACT OF THE DISCLOSURE

A shell cutter comprising a hollow cylindrical body having cutting teeth with square cutting edges substantially perpendicular to the rotational axis of the cutter and a side cutting edge at each side of each of the teeth, each side cutting edge of a tooth making an obtuse angle with the square cutting edge thereof, said cutting teeth including two sets of cutting teeth, the square cutting edges of one of the sets being shorter than the square cutting edges of the teeth of the other set, the teeth of said one set mounted on the shell to position the square cutting edges thereof axially forwardly of the square cutting edges of the teeth of said other set, said teeth arranged around the shell with a tooth of one set disposed intermediate teeth of the other set.

---

This application is a division of my pending application Ser. No. 468,302, filed June 30, 1965 and now Patent No. 3,364,939.

This invention relates to shell cutters for use with machines for tapping or cutting holes through the walls of pipes and, more particularly, to shell cutters suitable for cutting the coils of high carbon, high tensile strength steel wire which is helically wound around a pipe or other tubular body to circumferentially reinforce the wall of the pipe and embedded in concrete, cement mortar, resinbound mortar, or the like.

Prestressed concrete pipes are used in pipe lines for distributing water under pressure. They consist essentially of a tubular body or core of concrete, a tensioned wire helically wound around the tubular body and attached thereto at the pipe ends, and a protective coating of mortar encasing the wire and covering the exterior of the concrete body. In certain types of such pipes a water barrier in the form of a relatively thin metallic sleeve, such as a steel cylinder, overlies a concrete core and the prestressing wire is wound onto the exterior of the sleeve.

It sometimes becomes necessary to tap a prestressed concrete pipe in order to connect a branch pipe thereto. This has been accomplished by the use of tapping equipment including a saddle which is attached to the pipe and is used to temporarily support a tapping machine including a motor and a shell cutter. After the tap has been made the tapping machine is replaced by the desired branch pipe.

A shell cutter is selected which has an outside diameter equal to the diameter of the tap which is desired to be made. While shell cutters are available which are adequate for cutting through concrete and soft or mild steel, they are not suited for severing the coils of prestressing wire. Because of this it has been a practice to chip out a portion of the mortar coating over an area having an expanse much greater than the diameter of the ultimate tap in order to expose the coils of the prestressing wire in the vicinity of the proposed tap so that segments of the coils which would otherwise be under the sealing gland of a saddle and in the path of the cutter could be chiseled through and removed before the actual tapping operation was begun. The cutting of the wire at one point at a time is an arduous and time-consuming operation which is avoided in making a tap in accordance with the method of tapping disclosed in my said pending application Ser. No. 468,302. Moreover, the teeth of conventional shell cutters were easily damaged and frequently broke from contact with the separated coils of the hard, high tensile strength steel wire used in prestressed concrete pressure pipes. This often resulted in the interruption or failure of a tapping operation. To change a shell cutter it is necessary to demount the tapping machine from the saddle. Demounting, changing the shell cutter and reassembling the tapping machine onto the saddle is wasteful of time and costly.

The primary purpose of the present invention is to overcome the delays and expenses incident to the use of conventional shell cutters and to enable the tapping of a prestressed pipe in a continuous operation.

Another object is to provide a shell cutter adapted to efficiently cut through anchored coils of a highly tensioned wire wrapping of a high carbon, high tensile strength steel.

According to the invention the cutting edge of the shell cutter is provided with teeth having square cutting edges of different lengths and side cutting edges, the side cutting edges of each tooth forming an obtuse angle with its square cutting edge. The teeth with the shorter square cutting edges alternate around the shell cutter with the teeth having the longer square cutting edges.

The teeth are so disposed on the cutter that the shorter square cutting edges are positioned in a plane perpendicular to the axis of the cutter and axially forward of a plane parallel to such plane and containing the longer square cutting edges so that the teeth with the shorter square cutting edges lead the teeth with the longer square cutting edges during a cutting operation. In cutting through a wire and until the wire is severed each tooth individually cuts sloping bottom surface portions of a groove in the wire which converge inwardly toward the bottom of the groove. The compression strain on any one tooth is more evenly distributed widthwise over the nose of the tooth than occurs on a tooth having a square cutting edge and sides forming right angles or acute angles with the square cutting edge thereof. A shell cutter in which all of the teeth are formed with substantially square cutting edges and opposite side cutting edges meeting the square cutting edges in obtuse angles is conducive to a longer operating life.

The invention itself, as to its objects and advantages, and the manner in which it may be carried out, may be better understood by referring to the following description taken in connection with the accompanying drawing in which:

FIG. 1 is an outside view of part of a shell cutter;

FIG. 2 shows successive teeth of a shell cutter embodying the invention as seen from inside of the shell cutter;

FIG. 3 is a diagrammatic illustration of the relative proportions of the front faces and cutting edges of the two cutting teeth shown in FIG. 2;

FIG. 4 illustrates one of the two forms of cutting teeth in views from three directions; and FIG. 5 illustrates one of the other form of cutting teeth, again in views from three directions.

The wire normally used in a tensioned wire wrapping of a prestressed concrete pipe is a hard-drawn-steel spring wire, A.S.T.M. designation A–227. A suitable shell cutter for cutting such a wire is illustrated in the drawing. The cutter has a substantially cylindrical wall 45 and a transverse wall 46 to which the cutter is attached to a shaft of a tapping machine (not shown). The circular open or cutting edge of the shell is notched to provide a notch 47 between successive projections 48, with the projection and notches alternating around the circumference of the edge.

Tool tips of cutting teeth 49 and 50, preferably constituted of cemented carbide or of a "Stellite" alloy, are mounted in recesses providing abutment surfaces 51 and 52, and a groove 53 for receiving a tongue 54 at the back of a tip. The tips are brazed to the projections 48 at their surfaces of contact therewith. The tips 49 and 50 are mounted on adjacent projections in an alternating sequence around the shell cutter.

The cutting edges of the tips 49 and 50 are so ground as to cut chips of different proportions. FIG. 3 is a composite view illustrative of the relative proportions of the front surfaces of the cutting teeth. The outline 49B corresponds to the cutting edges of each tip 49 and the outline 50A corresponds to the cutting edges of each of the tips 50.

As shown in FIG. 4, the nose of each of the tips 50 has a square cutting edge 55 and side cutting edges 56 and 57 which meet with the edge 55 at an angle of about 120°. Suitable cutting clearance angles for the square cutting edge 55, and the side cutting edges 56 and 57 are of the order of approximately 7° and 5°, respectively. All of the tips 50 are set with their square cutting edges 55 disposed in a plane normal to the axis of rotation of the shell cutter and its drive shaft. This plane is indicated by the broken line 58.

One of the tips 49 of the other set of tips is illustrated in FIG. 5. This tip has a cutting nose with a square cutting edge 60 which is shorter than the square cutting edge 55 of the tips 50, and side cutting edges 61 and 62 shaped at an angle of approximately 120° with the edge 60. The cutting clearance angles of the square cutting edges 60 and of the side cutting edges 61 and 62 of the tips 49 are similar to the corresponding edges of the tips 50.

The tips 49 are so mounted on the shell cutter that their square cutting edges 60 also lie in a plane normal to the axis of rotation of the shell cutter but displaced axially forwardly of the plane indicated at 58. The plane containing the cutting edges 60 is indicated at 63. It is evident that the square cutting edges 60 of the set of teeth 49 lead the square cutting edges 55 of the set of teeth 50 in the direction of cutting and that chips of different sizes and shapes are removed as the teeth cut through each coil of a wire wrapping. A value of the ratio of the lengths of the square cutting edges 55 and 60 of approximately 1.75 is effective.

A shell cutter suitable for making a 12-inch diameter tap and having six teeth with square cutting edges 1/8 of an inch long, six teeth with square cutting edges 7/32 of an inch long, and the teeth with the square cutting edges of shorter length leading the teeth with the square cutting edges of longer length by 3/64 of an inch in the axial direction of the feed of the cutter operates efficiently to cut the high carbon spring steel wire commonly used in the manufacture of prestressed concrete pipe.

It is to be understood that the foregoing disclosure relates only to a preferred embodiment of the invention and that numerous modifications and alterations may be made without departing from the spirit and scope of the invention as set forth in the appended claims.

What is claimed is:
1. A shell cutter comprising a cylindrical hollow body having notches and projections in alternate sequence circumferentially along one edge of said body, a set of cutting teeth comprising a cutting tooth mounted on each of alternate ones of said projections, a second set of cutting teeth comprising a tooth mounted on each of such projections disposed intermediate said alternate ones of said projections, said teeth of said first and second sets each having a heel portion having a front face with opposite side edges converging inwardly toward said hollow body and an adjoining nose portion, said nose portion having a square cutting edge substantially perpendicular to the central longitudinal axis of said body and angled side cutting edges at the opposite sides of each tooth, said side cutting edges of each tooth meeting the square cutting edge thereof in obtuse angles, the other ends of said side cutting edges of each tooth meeting the opposite side edges of the front face thereof at the junction of the nose and heel portions of the tooth, said junction being at the broadest measurement of each tooth, said square cutting edges of said first set of teeth being shorter than and leading said square cutting edges of said second set of teeth in the axial direction of the cutter.

2. A shell cutter as set forth in claim 1 wherein said side cutting edges of each of said teeth meet the square cutting edges thereof in an angle of approximately 120°.

3. A shell cutter as set forth in claim 1 wherein the value of the ratio of the length of the square cutting edges of greater length to the length of the square cutting edges of shorter length is approximately 1.75 with said length of the shorter square cutting edges measuring approximately one-eighth of an inch.

References Cited

FOREIGN PATENTS 383,221  10/1923  Germany.

OTHER REFERENCES

Publication: Machinery, July 1933, p. 694, article entitled, "Reducing the Cost of Cutting Large Holes in Solid Metal by Trepanning," by R. R. Weddell.

FRANCIS S. HUSAR, *Primary Examiner.*

U.S. Cl. X.R.

125—20